(12) United States Patent
Prager

(10) Patent No.: US 9,057,166 B2
(45) Date of Patent: Jun. 16, 2015

(54) BLOWER APPARATUS

(75) Inventor: André Prager, Virginia Beach, VA (US)

(73) Assignee: Andreas Stihl AG & Co. KG, Waiblingen (DE)

( * ) Notice: Subject to any disclaimer, the term of this patent is extended or adjusted under 35 U.S.C. 154(b) by 671 days.

(21) Appl. No.: 13/422,515

(22) Filed: Mar. 16, 2012

(65) Prior Publication Data

US 2012/0234412 A1    Sep. 20, 2012

(30) Foreign Application Priority Data

Mar. 18, 2011   (DE) .......................... 10 2011 014 344

(51) Int. Cl.
| | | |
|---|---|---|
| *A47L 9/08* | (2006.01) | |
| *E01H 1/08* | (2006.01) | |
| *A01G 1/12* | (2006.01) | |

(52) U.S. Cl.
CPC .............. *E01H 1/0809* (2013.01); *A01G 1/125* (2013.01)

(58) Field of Classification Search
CPC ......... A47L 9/08; E01H 1/0809; A01G 1/125
USPC ................................. 15/405, 327.5
IPC .......................................................... A47L 9/08
See application file for complete search history.

(56) References Cited

U.S. PATENT DOCUMENTS

| 6,226,833 B1 | 5/2001 | Kawaguchi et al. |
| 6,843,639 B2 | 1/2005 | Schutt |

FOREIGN PATENT DOCUMENTS

DE           102 30 288 A1    1/2004

*Primary Examiner* — David Redding
(74) *Attorney, Agent, or Firm* — Gudrun E. Huckett

(57) ABSTRACT

A blower apparatus has a drive motor and a blower device operatively connected to the drive motor. A blower tube is connected to the blower device and has an outlet opening remote from the blower device. A blower air stream conveyed by the blower device passes through the blower tube in the direction of a longitudinal center axis of the blower tube and exits through the outlet opening in an outflow direction. A pivoting device that pivots the blower tube is provided. In a non-actuated state of the pivoting device the outflow direction is parallel to the longitudinal center axis of the blower tube. The pivoting device has a tilting device that tilts the outflow direction relative to the longitudinal center axis of the blower tube and utilizes a transverse force that is generated by the blower air stream at the outlet opening for pivoting the blower tube.

20 Claims, 7 Drawing Sheets

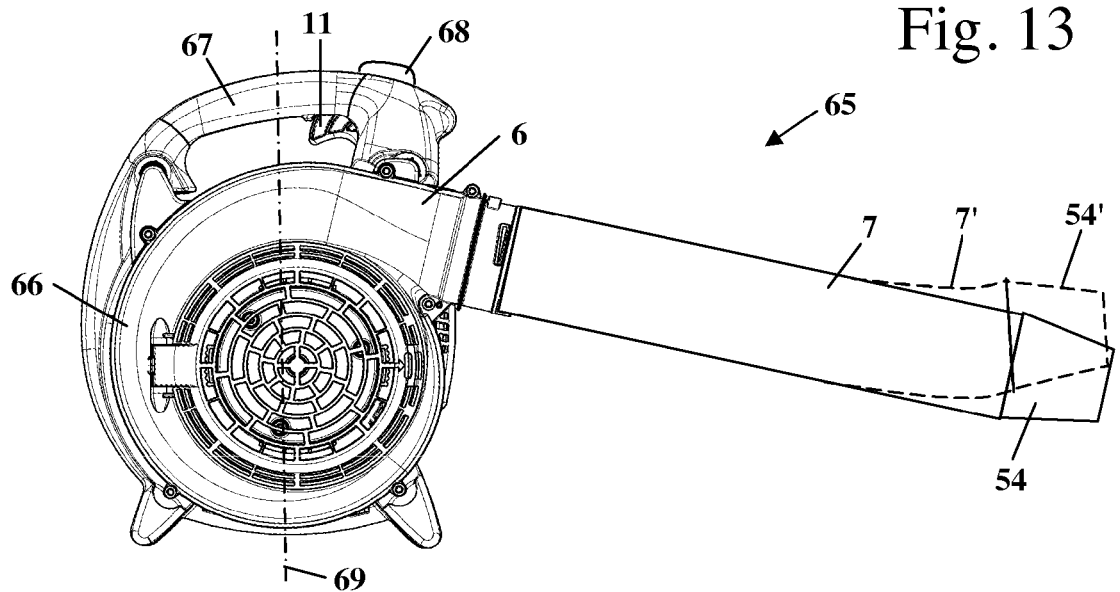
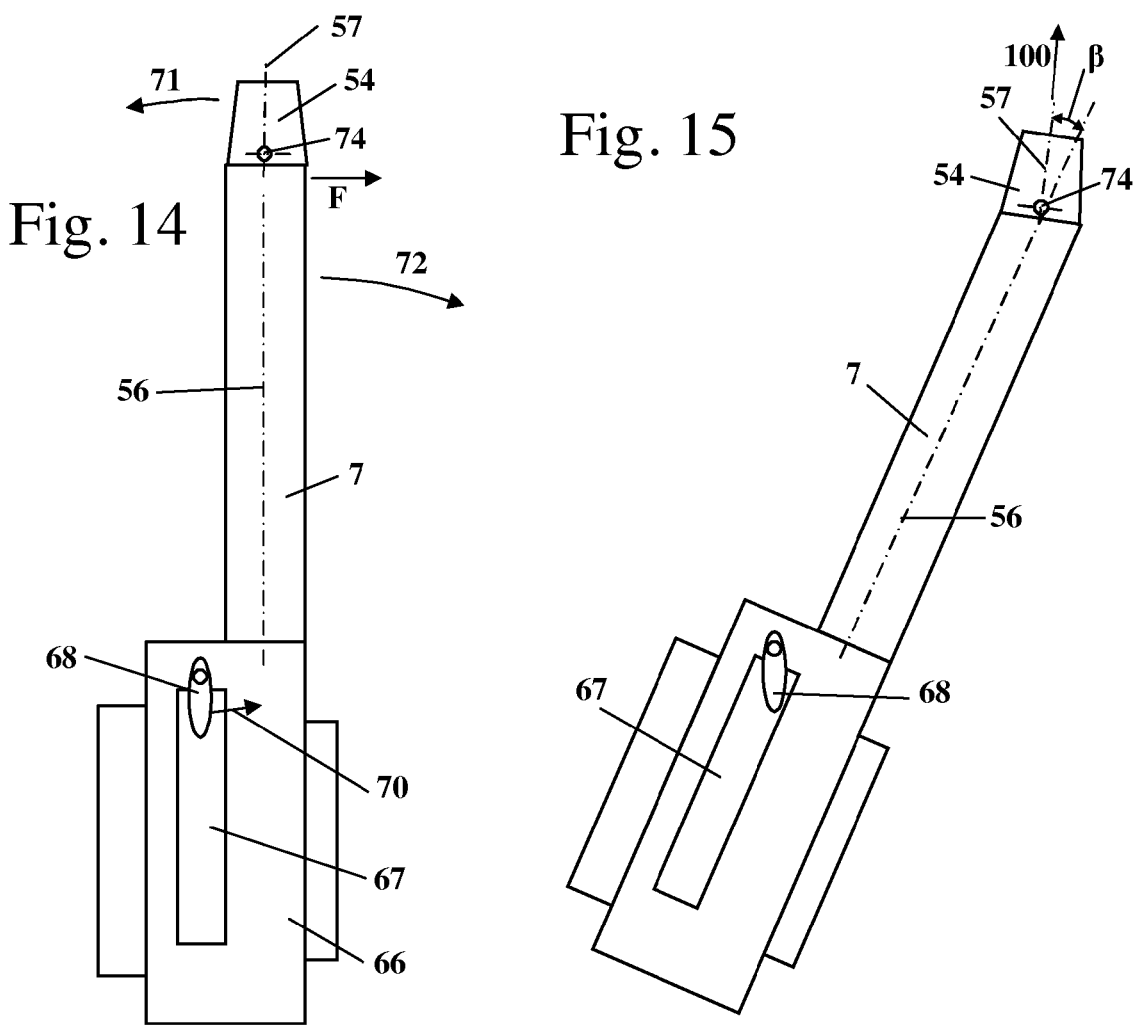

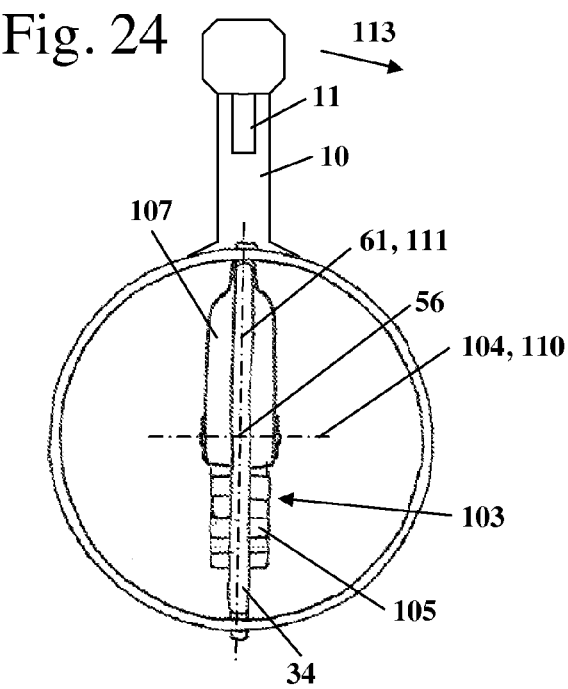
Fig. 24
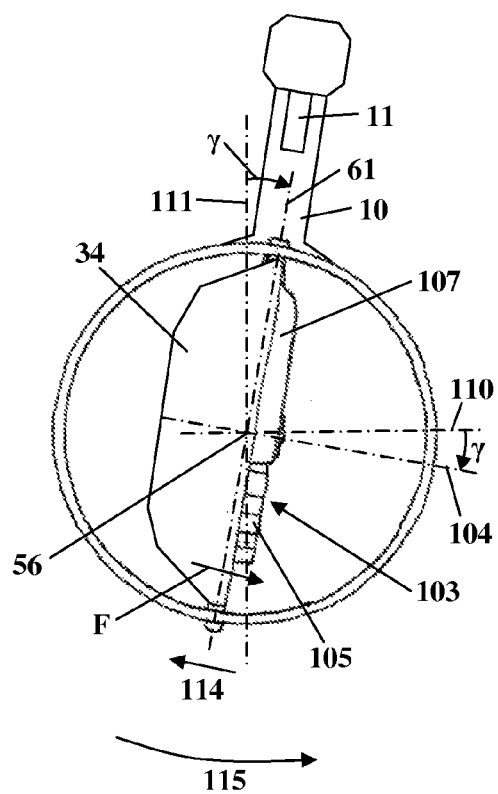
Fig. 25
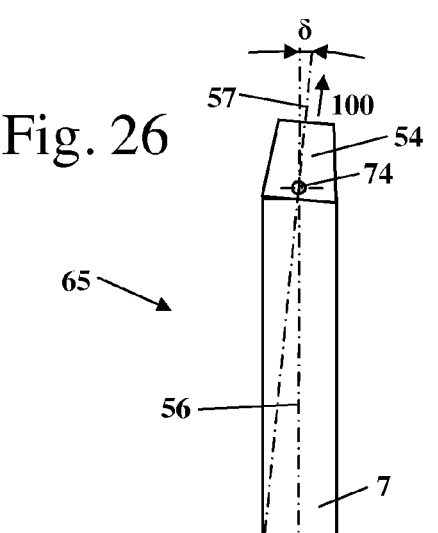
Fig. 26
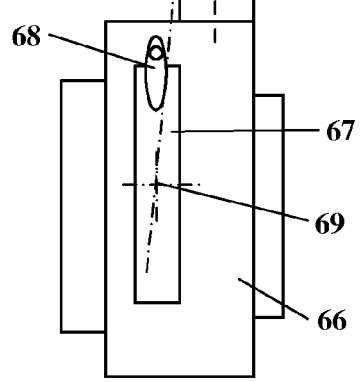

BLOWER APPARATUS

BACKGROUND OF THE INVENTION

The invention relates to a blower apparatus through which a blower air stream conveyed by a blower device is passing wherein the blower device is driven by a drive motor of the blower apparatus. The blower air stream flows in the blower tube in the direction of a longitudinal center axis of the blower tube and exits from the blower tube at an outlet opening in an outflow direction. The blower apparatus has a pivoting device for pivoting the blower tube and, in the non-actuated state of the pivoting device, the outflow direction is parallel to the longitudinal center axis of the blower tube.

Handheld or backpack blower apparatus in which the blower tube is guided by the operator are known in general. In the usual operating mode, the blower tube is moved back and forth by the operator and/or is moved up and down, for example, to blow away leaves or the like. When the blower apparatus is embodied as a spraying device, the movement of the blower tube serves for uniformly distributing the material to be sprayed onto the surfaces to be sprayed with the material.

U.S. Pat. No. 6,226,833 B1 discloses a blower apparatus that is supported by wheels on the ground and has a blower tube adjusted by means of Bowden cables. In this connection, the entire blower tube is moved by means of the Bowden cables. This requires a comparatively large force.

SUMMARY OF THE INVENTION

It is an object of the present invention to provide a blower apparatus of the aforementioned kind that enables force-saving work with the blower apparatus.

In accordance with the present invention, this is achieved in that the pivoting device has a tilting device configured for tilting the outflow direction relative to the longitudinal center axis of the blower tube and utilizes a transverse force that is generated by the blower air stream at the outlet opening for pivoting the blower tube.

For pivoting (swiveling) the blower tube, it is provided to adjust the outflow direction out of the blower tube. When the outflow direction out of the blower tube is tilted relative to the longitudinal center axis of the blower tube, the deflection of the blower air stream generates a transverse force out of the blower tube that effects pivoting of the blower tube to the side of the blower tube that is facing away from the outflow direction. In this way, a pivot movement of the blower tube can be achieved in a simple way. The energy for pivoting is provided by the blower air stream itself and not by the operator so that a force-saving ergonomic working with the blower apparatus is enabled.

A simple configuration results when for tilting the outflow direction, at least one adjustable flow guiding element is arranged direction in the blower tube in the area of the outlet opening. For example, in order to be able to adjust the outflow direction horizontally as well as vertically, several flow guiding elements can be provided. A simple configuration results when the outlet opening is formed on an adjustable nozzle. The nozzle can be adjusted in particular in all directions so that pivoting of the blower tube horizontally, vertically but also in all slanted directions in-between is enabled.

Advantageously, the pivoting device comprises an actuating element that is to be actuated by the operator for adjusting the outflow direction. An intuitive operation results when the outflow direction is adjusted in a direction opposite to the actuation direction of the actuating element. The blower apparatus moves opposite to the direction in which the outflow direction is adjusted. The blower tube moves thus in the direction in which the actuating element is adjusted also. For example, upon movement of the actuating element to the left, the outflow direction is moved to the right so that the blower tube is pivoted to the left.

A simple configuration with ergonomic handling results when the blower apparatus comprises a handle that is pivotably supported and forms the actuating element. For pivoting the blower tube, the operator must only pivot the handle in particular about a pivot axis that is arranged approximately perpendicularly to the longitudinal center axis of the blower tube, and the blower tube follows this pivot movement as a result of the pivoting device. However, it can also be provided that at least one section of the blower tube is rotatably supported about the longitudinal center axis; on this section, the handle is secured. The handle and this section together form the actuating element. For pivoting the blower tube, the handle must be tilted and, in this way, the blower tube is rotated about the longitudinal center axis. In this way, a simple ergonomic operation of the pivoting device of the blower tube is achieved also. However, an operating lever as an actuating element may be provided also; such an operating lever is actuated by the operator, for example, by the operator's thumb.

It can also be provided that the actuating element comprises a sensor for detecting a pivot movement that has been initiated by the operator. Advantageously, the sensor is a gyro sensor. The sensor can be an electronic but also a mechanical sensor. A mechanical gyro as a gyro element can be driven, for example, by the blower air stream. A gyro sensor detects a positional change. When the blower tube is pivoted by the operator, the gyro sensor can detect the initiated pivot movement and can assist this movement by changing the outflow direction so that the operator must apply only minimal forces for pivoting.

The movement of the actuating element can be transmitted, for example, mechanically or electrically onto the tilting device for tilting the outflow direction. Advantageously, the actuating element effects a periodic adjustment of the outflow direction. The operator can advantageously adjust the frequency and/or pivot travel (stroke) of the blower tube and the pivoting device changes the outflow direction periodically to one side or the other side or upward and downward so that the blower tube is pivoted in a reciprocating movement laterally back and forth or up and down. In this connection, it is in particular provided that the operator operates the pivoting device by means of an input device such as a keypad, a touchpad or the like.

Advantageously, the tilting device for the outflow direction comprises an electrical actuator. For energy supply of the electrical actuator, a separate battery, a generator driven by the blower air stream or an energy supply device of the drive motor of the blower apparatus may be used. In this connection, the energy supply device of the drive motor is advantageously the ignition device in case of a drive motor embodied as an internal combustion engine and a battery pack, a battery or an electric cable for connection to an electric socket in case of an electric motor as a drive motor.

A simple configuration results when the device for tilting the outflow direction comprises a rotor whose position is changed by the actuating element. When the position of a rotor, i.e., a gyro, is changed, gyroscopic forces, i.e., gyro forces, are acting on the rotor. Advantageously, the gyroscopic forces are utilized for tilting the outflow direction. For adjusting the outflow direction, advantageously no additional drive elements and no additional energy are required so that a simple configuration results. Existing blower apparatus can be retrofitted simply with such a rotor. Advantageously, the rotor is driven by the blower air stream. In this connection, the axis of rotation of the rotor is advantageously perpendicular to the flow direction of the blower air stream. An advantageous arrangement results when the device for tilting the outflow direction comprises a flow guiding element, when the rotor is supported rotatably on the flow guiding element about an axis of rotation, and when the rotor together with the flow guiding element is supported pivotably on the blower tube about a common pivot axis. The gyro forces acting on the rotor are thus acting immediately on the flow guiding element and pivot the rotor with the flow guiding element when appropriate forces are acting on the rotor. In this connection, the axis of rotation and the pivot axis extend transversely to each other, i.e., at an angle that is greater than 0 degrees. Advantageously, the axis of rotation and the pivot axis are perpendicular to each other so that the acting gyro forces act completely in the pivot direction of the flow guiding element and can be utilized well. In this connection, it is in particular also provided that the axis of rotation and the pivot axis are positioned in the same plane and intersect each other.

In particular, the pivoting device has an element for restoring the outflow direction parallel to the longitudinal axis of the blower tube. By means of the restoring device for the outflow direction, it is ensured that at the end of the pivot travel no transverse force is acting anymore on the blower tube and the blower tube remains in the deflected position. The restoring device for the outflow direction is in particular in the form of springs that secure the actuating element or a flow guiding element at the outlet opening in the non-deflected position or return it into this position. With an appropriate design of the pivot axis of the actuating element, however, an automatic return, for example, based on gravity, can be achieved also.

Advantageously, the blower apparatus is a handheld blower apparatus that has a housing on which a blower tube and a handle are secured. The handle in this connection is fixedly connected by means of the housing with the blower tube so that the blower tube can be directly guided by the operator. However, the blower apparatus can also be a backpack blower apparatus, in particular a spraying device, wherein the blower tube is arranged movably relative to a backpack carrying frame and wherein a handle is arranged on the blower tube. In this case, the blower tube is also directly guided by the operator.

BRIEF DESCRIPTION OF THE DRAWING

FIG. 13 a side view of an embodiment of a blower apparatus.

FIG. 14 is a schematic plan view of the blower apparatus of FIG. 13 in the rest position.

FIG. 15 is a plan view onto the blower apparatus of FIG. 14 after pivoting.

FIG. 24 is a side view in the direction of arrow XXIV of FIG. 23.

FIG. 25 is a side view in accordance with FIG. 24 after pivoting of the handle.

FIG. 26 is schematic plan view of an embodiment of the blower apparatus as shown in FIG. 13 in rest position.

DESCRIPTION OF THE PREFERRED EMBODIMENTS

Figure 1:
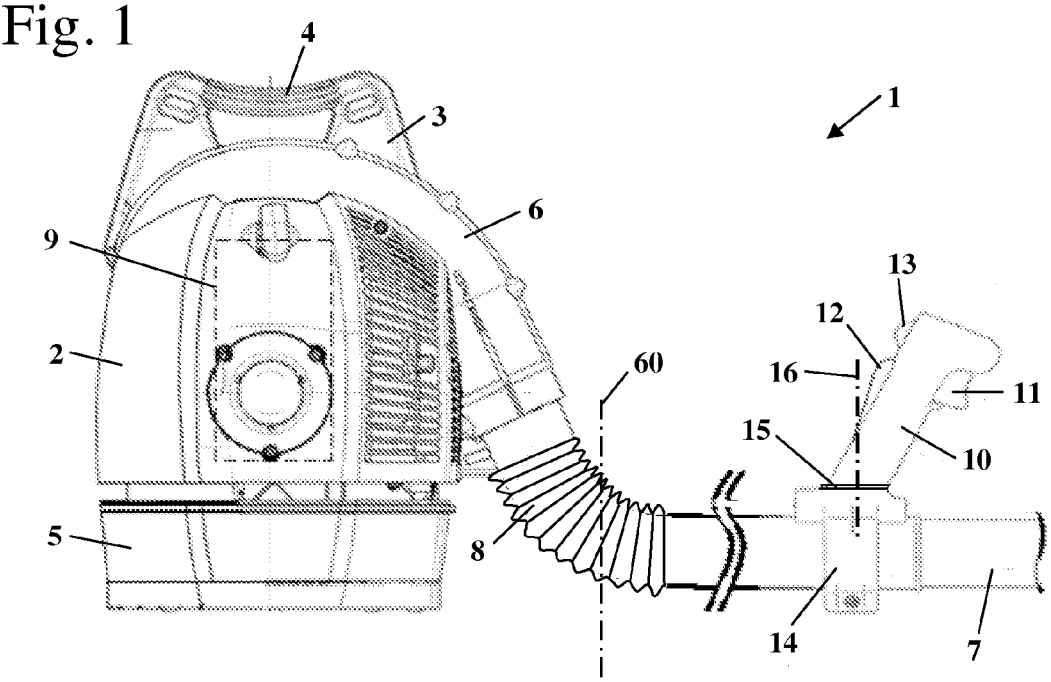
FIG. 1 is a side view of a backpack blower apparatus.
Figure 2:
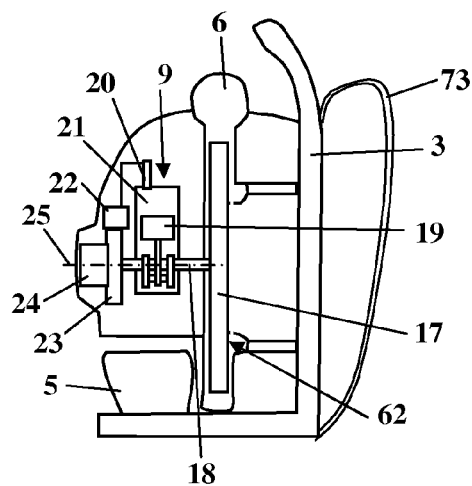
FIG. 2 is a schematic section view of the blower apparatus of FIG. 1.

FIG. 1 shows a blower apparatus 1 to be carried on the back of the operator (backpack blower apparatus). The blower apparatus 1 has a housing 2 in which a drive motor 9 is arranged. The drive motor 9 is embodied as an internal combustion engine. As shown in FIG. 2, the drive motor 9 has a piston 19 that drives in rotation a crankshaft 18 about axis of rotation 25. The piston 19 delimits a combustion chamber 21 into which a spark plug 20 projects. The spark plug 20 is connected to an ignition module 22 that is arranged on the outer circumference of a fan wheel 23. The fan wheel 23 is fixedly connected to the crankshaft 18 and has one or several pole shoes that induce the ignition voltage in a coil of the ignition module 22. The ignition module 22 may also provide the energy for further electrical consumers of the blower apparatus 1. Adjacent to the fan wheel 23, a starter device 24 is arranged that is advantageously configured as a cable starter and serves for starting the drive motor 9. On the side opposite the starter device 24 a blower wheel 17 is connected to the crankshaft 18. The blower wheel 17 conveys working air into a blower spiral 6. The blower wheel 17 constitutes the blower device 62 of the blower apparatus 1. As shown in FIG. 1, the outlet of the blower spiral 6 is connected by means of a folded bellows section 8 to the blower tube 7 into which the blower air stream is conveyed. The folded bellows section 8 enables a movement of the blower tube 7 in all spatial directions. In case of a pivoting movement in approximately horizontal orientation, the blower tube 7 is approximately pivoted about a pivot axis 60 that is schematically illustrated in FIG. 1.

A handle 10 is arranged at the blower tube 7. The handle 10 is connected by means of a sleeve 14 with the blower tube 7. The handle 10 is pivotable relative to the sleeve 14 at a rotary joint 15 about axis of rotation 16. The handle 10, viewed from the position of the operator, can be pivoted to the right and to the left. On the handle 10 a throttle trigger 11, a throttle lock 12, and a stop switch 13 are arranged.

As shown in FIGS. 1 and 2, the housing 2 of the blower apparatus 1 is arranged on a carrying frame 3. In the upper area, the carrying frame 3 has a carrying handle 4. In operation, the operator carries the carrying frame 3 by means of shoulder straps 73 on the operators's back. As also shown in FIGS. 1 and 2, below the housing 2 a fuel tank 5 for supply of fuel to the drive motor 9 is provided.

Figure 3:
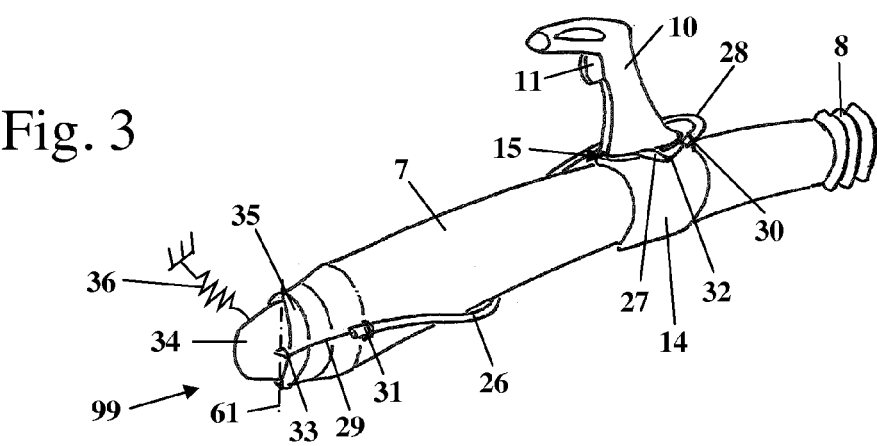
FIG. 3 shows the blower tube of the blower apparatus of FIG. 1 with the pivoting device in the rest position.

FIG. 3 shows a pivoting device 99 of the blower apparatus 1. As shown in FIG. 3, the handle 10 that is supported rotatably on the sleeve 14 is provided with an actuating lever 27 that is fixedly connected to the handle 10 and extends outwardly relative to the axis of rotation 16. The first end 32 of an inner wire 29 of a Bowden cable 26 is connected to the actuating lever 27. The first end 30 of a Bowden cable housing 28 of the Bowden cable 26 is connected to the sleeve 14. A second end 31 of the Bowden cable housing 28 is secured on the blower tube 7 adjacent to an outlet opening 35 of the blower tube 7. The blower air stream exits from the blower tube 7 through the outlet opening 35. In the area of the outlet opening 35, a flow guiding element 34 is arranged on the blower tube 7 and is embodied as a flat plate. A second end 33 of the inner wire 29 of the Bowden cable 26 is connected to the flow guiding element 34. Upon rotation of the handle 10 to the right, when viewed from the position of the operator, the inner wire 29 of the Bowden cable 26 is pulled through the Bowden cable housing 28 to the first end 32. In this way, the flow guiding element 34, viewed from the position of the operator, is pivoted to the left, i.e., opposite to the pivot movement of the handle 10. Pivoting of the flow guiding element 34 is carried out against the force of the spring 36 that is indicated schematically in FIG. 3. The spring 36 can engage the flow guiding element 34 but also the Bowden cable 26 and effects a restoring movement of the flow guiding element 34 into the non-actuated position. In the non-actuated position no transverse force F is acting on the blower tube 7. Advantageously, the flow guiding element 34 is also spring-loaded in the opposite direction. In this way, the flow guiding element 34 is also returned into the non-actuated position when rotating the handle 10 to the left and pivoting the flow guiding element 34 to the right.

Figure 4:
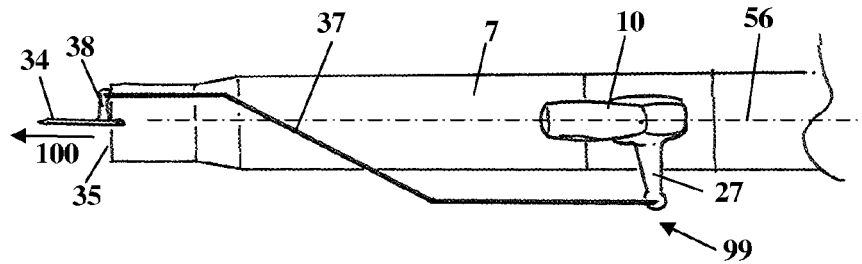
FIG. 4 is a schematic plan view onto a blower tube with pivoting device in rest position.
Figure 5:
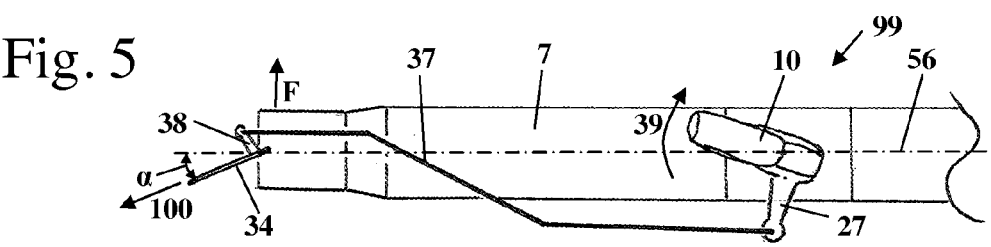
FIG. 5 shows the blower tube of FIG. 4 with actuated pivoting device before pivoting.
Figure 6:
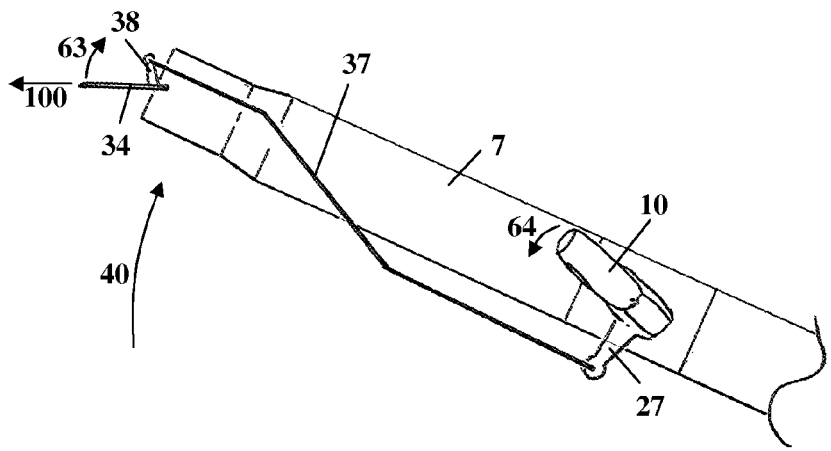
FIG. 6 shows the blower tube of FIG. 4 after pivoting and before return of the pivoting device.

FIGS. 4 through &show a further embodiment based on which the function of the pivoting device 99 will be explained. In the embodiment according to FIGS. 4 to 6, instead of the Bowden cable 26 for mechanical transmission of the adjusting movement of the handle 10 onto the flow guiding element 34, a linkage 37 is provided. FIG. 4 shows the pivoting device 99 in the non-actuated position. The handle 10 and the flow guiding element 34 are oriented in the direction of a longitudinal center axis 56 of the blower tube 7. The blower air stream flows out of the outlet opening 35 in the outflow direction 100 that is parallel to the longitudinal center axis 56 and to the flow guiding element 34. As shown in FIGS. 4 to 6, the linkage 37 engages an actuating lever 38 that is fixedly connected to the flow guiding element 34.

For pivoting the blower tube 7, the operator moves the handle 10 that serves as an actuating element in the direction of arrow 39, i.e., in clockwise direction in the illustrations in plan view. By means of the linkage 37 the flow guiding element 34 is deflected in the opposite direction, i.e., in counterclockwise direction. The flow guiding element 34 and the outflow direction 100 extending parallel to the flow guiding element 34 are positioned at angle α relative to the longitudinal center axis 56. The angle α can be, for example, in the range between approximately 5 degrees and approximately 75 degrees. As a result of the outflow direction 100 being positioned at a slant relative to the longitudinal center axis 56, the blower air stream exerts a transverse force F on the blower tube 7 that is acting perpendicular to the longitudinal center axis 56 in the direction of the side that is facing away from the flow guiding element 34. Because of the transverse force F, the blower tube 7, as indicated in FIG. 6 by the arrow 40, is pivoted in clockwise direction. After carrying out the pivot movement, the handle 10 is pivoted back in the direction of arrow 64 in counterclockwise direction into the initial position, for example, by an appropriate spring action. Accordingly, the flow guiding element 34 is pivoted in the direction of arrow 63 into the initial position in which the outflow direction 100 is parallel to the longitudinal center axis 56 of the blower tube 7. As soon as the flow guiding element 34 is again oriented parallel to the longitudinal center axis 56, transverse forces F are no longer acting on the blower tube 7. The operator by pivoting the handle 10 about the axis of rotation 16 can thus pivot the entire blower tube 7. By periodic back and forth rotation of the handle 10, the blower tube 7 can be periodically pivoted back and forth. In this way, simple ergonomic working is enabled. The restoring action into the initial position can be realized by the operator or advantageously by an appropriate spring action of the handle 10, of the linkage 37, and/or of the flow guiding element 37.

Figure 7:
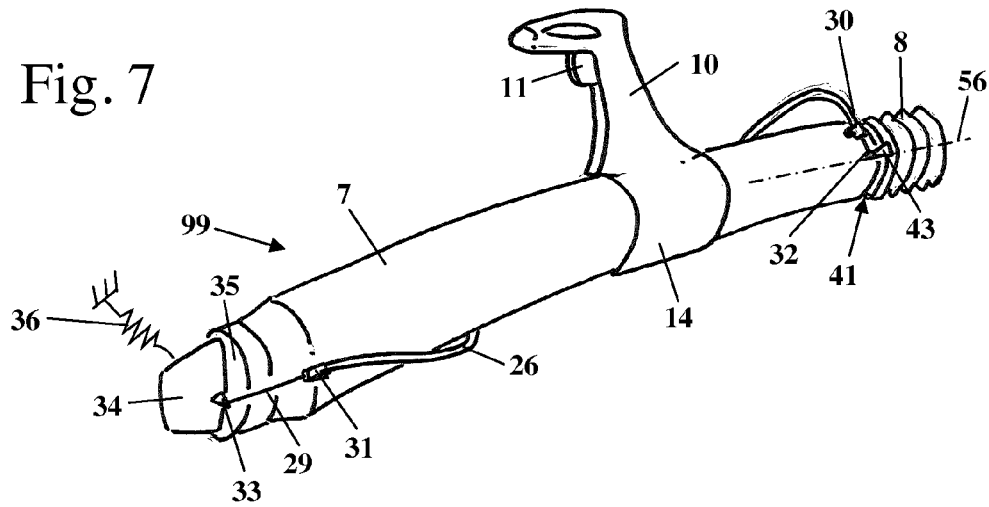
FIG. 7 is a perspective illustration of an embodiment of a pivoting device.

In the embodiment illustrated in FIG. 7, the handle 10 is connected fixedly to the sleeve 14. The blower tube 7 is supported rotatably relative to the folded bellows section 8 by means of rotary joint 41. The blower tube 7 can be pivoted relative to the folded bellows section 8 about the longitudinal center axis 56 of the blower tube 7. The first end 32 of the inner wire 29 of the Bowden cable is connected by means of an actuating lever 43 with the folded bellows section 8. The first end 30 of the Bowden cable housing 28 is connected to the blower tube 7. As also shown in the embodiment illustrated in FIG. 3, the second end 33 of the inner wire 29 of the Bowden cable is connected to the flow guiding element 34 and the second end 31 of the Bowden cable housing 28 with the blower tube 7. When pivoting the handle 10 to the right, viewed from the position of the operator, the flow guiding element 34 is deflected to the left and the blower tube 7 is pivoted as a result of the created transverse force F to the right. Pivoting of the handle 10 to the left pivots the blower tube 7 to the left.

Figure 8:
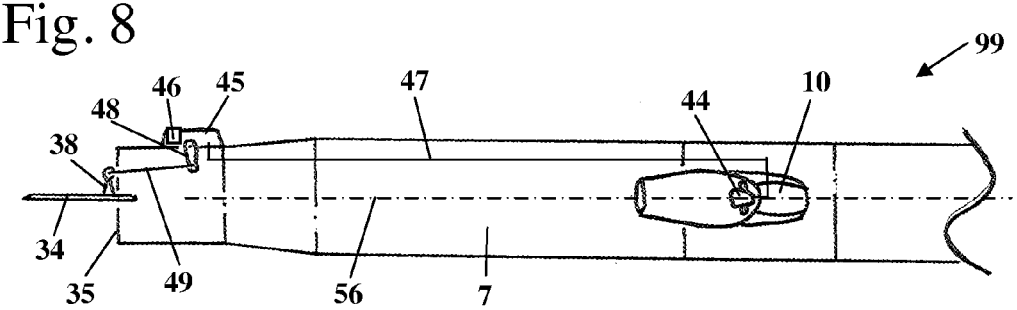
FIG. 8 is a schematic illustration of an embodiment of the pivoting device.

In the embodiment of a pivoting device 99 illustrated in FIG. 8, on the handle 10 that is fixedly connected to the blower tube 7 an operating lever 44 is arranged that is pivotable by the operator, for example, by operator's thumb, to the right or to the left. The deflection of the operating lever 44 is transmitted by an electrical connecting line 47 to a solenoid 45 that is supplied by a battery 46 with energy. The solenoid 45 deflects by means of an actuating lever 48 and a coupling rod 49 the actuating lever 38 at the flow guiding element 34. Upon pivoting of the operating lever 44 in plan view of FIG. 8 in upward direction (to the right when viewed from the position of the operator), the flow guiding element 34 is pivoted downwardly (to the left viewed from the position of the operator), so that a transverse force F in upward direction results and vice versa. The operating lever 44 is advantageously spring-loaded in the direction toward the non-actuated position illustrated in FIG. 8 and controls the solenoid 45 in such a way that the latter, after completion of the pivot movement, will return the flow guiding element 34 into the initial position.

Figure 9:
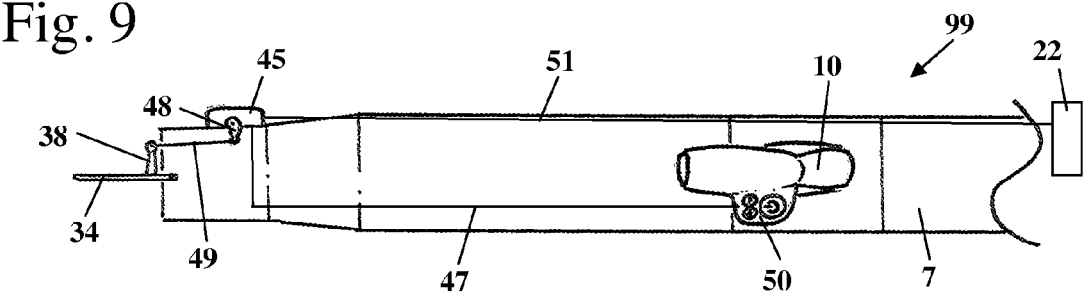
FIG. 9 is a schematic illustration of another embodiment of the pivoting device.

In the embodiment illustrated in FIG. 9, on the handle 10 a keypad 50 is provided that, for example, comprises a foil-type keypad or a touchpad or is in the form of several switches. In addition, a display on the handle 10 can be provided. The operator can control the pivot movement of the pivoting device 99 by means of the keypad 50. In this connection, is also possible to provide a periodic movement of the blower tube 7 in particular by predetermining the frequency and the stroke of the deflection. As in the embodiment of FIG. 8, a connecting line 47 is connected to a solenoid 45; the keypad 50 acts through the connecting line 47 on the solenoid 45. The solenoid 45 is connected by connecting line 51 with the ignition module 22 of the internal combustion engine and is supplied by it with energy.

Figure 10:
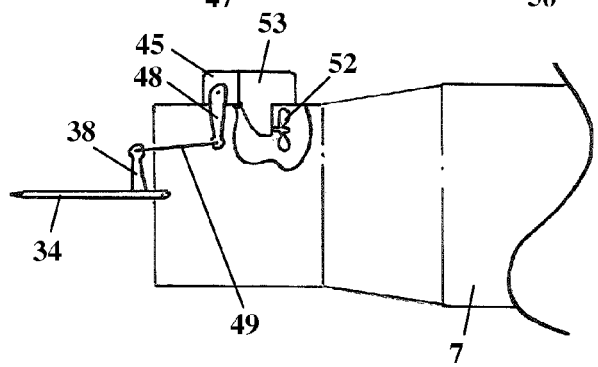
FIG. 10 is a schematic illustration of yet another embodiment of the pivoting device.

FIG. 10 shows an alternative embodiment for the energy supply of the solenoid 45. The control element for deflecting the solenoid 45 can be embodied in this connection in the same way as in the preceding Figures. In the blower tube 7 a wind wheel 52 is arranged so as be exposed to the blower air stream; the wind wheel drives a generator 53. The generator 53 converts the rotation of the wheel 52 into electrical energy for actuating the solenoid 45.

Figure 11:
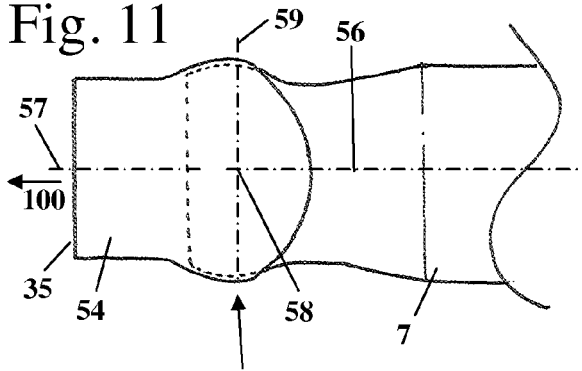
FIG. 11 shows a blower tube with pivotable nozzle in a plan view.
Figure 12:
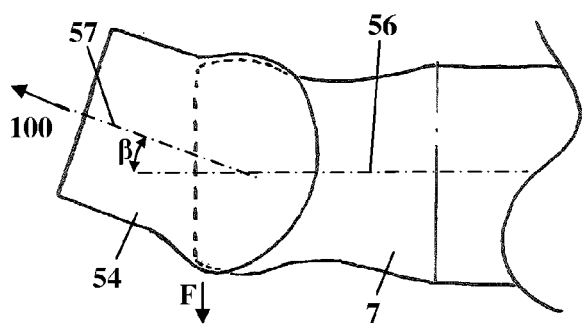
FIG. 12 shows the blower tube of FIG. 11 with pivoted nozzle.

In FIGS. 11 and 12, instead of a flow guiding element 34 in the blower tube 7, an adjustable nozzle 54 is provided at the end of the blower tube 7. In this context, the term nozzle is to be understood to have a broad meaning and refers to an element movably arranged at the end of the blower tube 7 that guides the blower air stream. In the non-actuated position illustrated in FIG. 11, the longitudinal center axis 57 of the nozzle 54 is parallel to the longitudinal center axis 56 of blower tube 7. The nozzle 54 is secured by means of a pivot bearing 55 on the blower tube 7 that enables pivoting about a first pivot axis 58 that is perpendicular to the paper plane of the drawing as well as to the pivot axis 59 that is perpendicular thereto. In this way, the nozzle 54 can be moved or deflected up and down and laterally to the right and to the left as well as in all intermediate directions.

In the actuated state that is illustrated in FIG. 12, the longitudinal center axis 57 of the nozzle 54 is positioned relative to the longitudinal central axis 56 at an angle β. In this way, a transverse force F is acting on the blower tube 7 by the blower air stream and causes the blower tube 7 to deflect.

FIG. 13 shows the embodiment of a hand-held blower apparatus 65. The blower apparatus 65 has a housing 66 on which a handle 67 is secured by means of antivibration elements, not illustrated. In the housing 66 an internal combustion engine, not illustrated, is arranged as a drive motor that by means of a blower device conveys of blower air stream through a blower spiral 6. The inner configuration corresponds approximately to the configuration of the blower apparatus 1 illustrated in FIG. 2. At the exit from the blower spiral 6 a blower tube 7 is secured that has a pivotable nozzle 54 at its end. The nozzle 54 is pivotable about pivot axis 74 that, in the regular working position, is arranged approximately perpendicular or slightly inclined to the vertical. In addition or alternatively, pivoting of the nozzle 54 about a horizontally positioned pivot axis in the usual working position is possible also. On the handle 67 a throttle trigger 11 as well as an operating lever 68 are arranged. The operating lever 68 acts on a pivoting device that is not illustrated in detail in FIGS. 13 to 15. The pivoting device can be designed in accordance with any of the pivoting devices of the preceding Figures.

Upon pivoting of the operating lever 68 in the direction of arrow 70 shown in FIG. 14, the nozzle 54 pivots about pivot axis 74 in opposite direction, i.e., in the direction of arrow 71. In this way, a transverse force F is exerted onto the blower tube 7 that pivots the blower tube 7 in the direction of arrow 72. The pivot position of the blower apparatus 65 is illustrated in FIG. 15. Since the operator holds the blower apparatus 65 by the handle 67, the blower tube pivots with the entire blower apparatus 65 about pivot axis 69 illustrated in FIG. 13; this pivot axis 69 extends approximately through the center of the handle 67. As shown in FIG. 15, the longitudinal center axis 57 of the nozzle 54 is positioned relative to the longitudinal center axis 56 of the blower tube 7 in actuated position of the pivoting device at an angle β. After pivoting, the nozzle 54 is returned into its central position, for example, by appropriate spring action. In this way, no further transverse force F is acting on the blower tube 7.

The blower tube 7 in the embodiment of FIG. 7 is straight. Alternatively, a curved blower tube can be used. A curved blower tube is schematically shown in FIG. 13 as blower tube 7'. The blower tube 7' is curved upwardly in the illustrated work position. A bend in a different direction may be advantageous also. A nozzle 54' is arranged at the blower tube 7' and is pivotable about a pivot axis 74 illustrated in FIGS. 14 and 15. The pivot axis 74 is oriented approximately perpendicular or slightly inclined relative to the vertical in the usual work position illustrated in FIG. 13. In all the other embodiments, it is also possible to employ a curved blower tube 7' in place of the straight blower tube 7.

Figure 16:
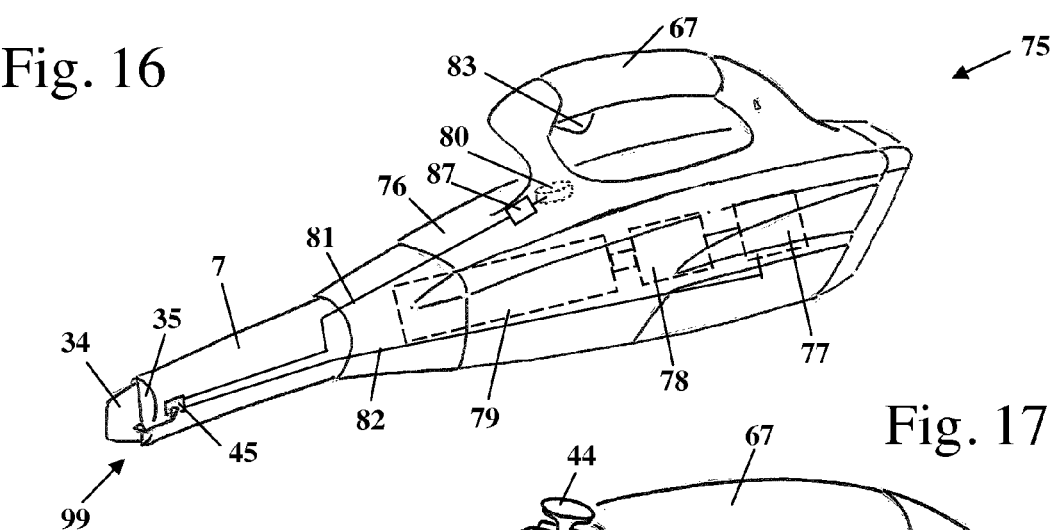
FIG. 16 is a schematic perspective illustration of an embodiment of a blower device.

FIG. 16 shows schematically a blower apparatus 75 that is also embodied as a hand-held blower apparatus. The blower apparatus 75 comprises a housing 76 on which a handle 67 is secured. On the handle 67 an operating lever 83 for a drive motor 78 arranged in the housing 76 is provided. The drive motor 78 is embodied as an electric motor and is supplied with energy by battery pack 77 arranged within the housing 76.

The drive motor 78 drives a blower device 79 that conveys a blower air stream through the blower tube 7 of the blower apparatus 75. As shown also in FIG. 16, in the area of the outlet opening 35 a flow guiding element 34 is arranged in the blower tube 7 that is controlled by solenoid 45. The solenoid 45 is supplied with electrical energy by the battery pack 77. The solenoid 45 is connected to the battery pack 77 by connecting line 82. The blower apparatus 75 comprises a gyro sensor 80 that is connected by means of evaluation electronics 87 and a connecting line 81 to the solenoid 45. The gyro sensor 80 detects a pivot movement that is initiated by the operator at the handle 67 of the blower apparatus 75. The evaluation electronics 87 detects a pivot movement and transmits a corresponding signal to the solenoid 45. The solenoid 45 adjusts the flow guiding element 34 in the outlet opening 35 so that the pivot movement initiated by the operator is amplified and the blower apparatus 75 is pivoted in the direction desired by the operator. In the shown embodiment, the gyro sensor is arranged in the housing 76 in the area adjacent to the handle 67. However, it may also be advantageous to arrange the gyro sensor 80 adjacent to the outlet opening 35, for example, together with the solenoid 45 in a common module. Instead of the illustrated electrical gyro sensor also a mechanical gyro can be provided as a gyro element. The drive action of a mechanical gyro element can be realized, for example, by the blower air stream that is conveyed through the blower tube 7.

Figure 17:
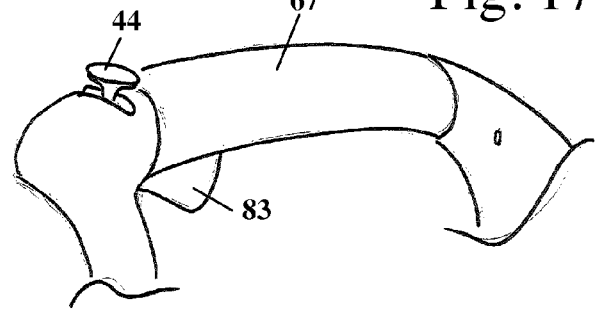
FIG. 17 shows schematically a perspective illustration of an embodiment of a handle of a blower apparatus.

In the embodiment according to FIG. 17, an operating lever 44 is provided on the handle 67 instead of a gyro sensor 80 as actuating element.

Figure 18:
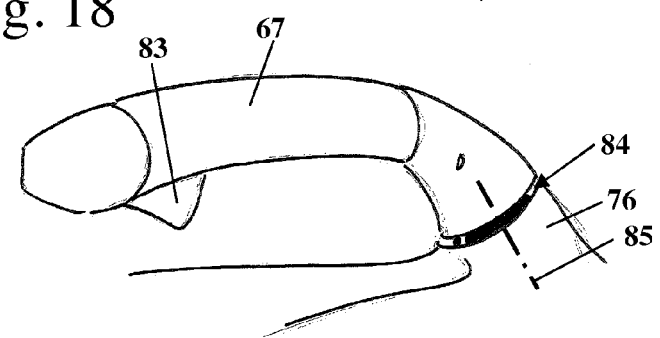
FIG. 18 shows schematically in perspective illustration another embodiment of a handle of a blower apparatus.

In the embodiment according to FIG. 18, the handle 67 is pivotably supported on the housing 76 with a rotary joint 84 about rotary axis 85 and constitutes the actuating element for the pivoting device 99. The axis of rotation 85 is not positioned perpendicularly but at a slant. In this way, an automatic centering action is realized. The weight of the blower apparatus 75 effects a return movement into the non-actuated position of the pivoting device.

Figure 19:
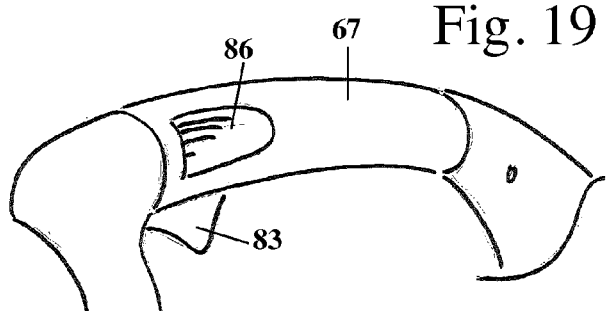
FIG. 19 shows schematically in a perspective illustration yet another embodiment of a handle of a blower apparatus.

In the embodiment according to FIG. 19, on the handle 67 sensor surfaces 86 are provided wherein advantageously on each side of the handle 67 at least one sensor surface is provided. The sensor surfaces 86 react, for example, to pressure and recognize a pivot movement of the blower apparatus 75 initiated by the operator by means of the pressure exerted onto the sensor surfaces 86. The pivot movement desired by the operator is amplified by appropriate adjustment of the flow conducting element 34 or a nozzle 54 arranged within the end of the blower tube.

Figure 20:
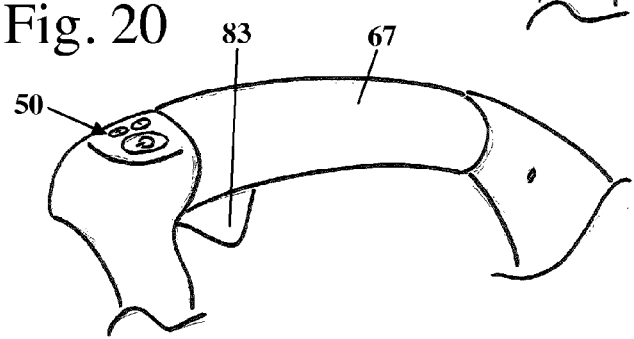
FIG. 20 shows schematically in a perspective illustration a further embodiment of a handle of the blower apparatus.

In the embodiment according to FIG. 20, for actuation of the pivoting device 99 a keypad 50 is provided.

Figure 21:
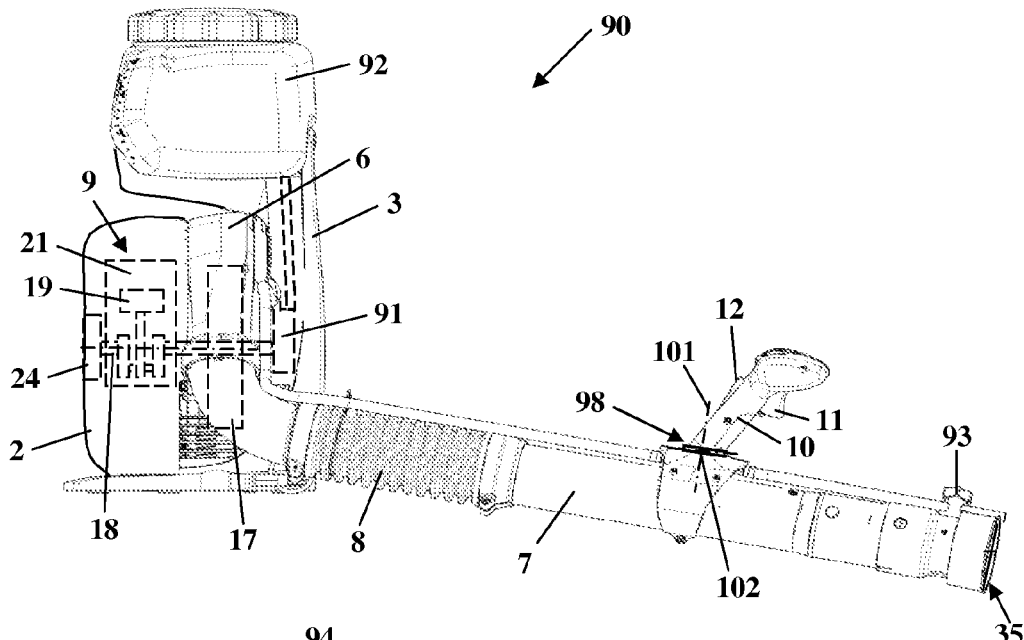
FIG. 21 shows schematically a side view of a spraying apparatus.

In the embodiment illustrated in FIG. 21, a blower apparatus 90 is shown that is embodied as a sprayer device. The blower apparatus 90 comprises a housing 2 that is arranged on a carrying frame 3. In the housing 2 a drive motor 9 embodied as an internal combustion engine is arranged. The configuration corresponds to the configuration shown in FIG. 2 wherein same reference numerals indicate same elements. On the carrying frame 3 a spraying agent container 92 is arranged also. The crankshaft 18 of the drive motor 9 drives also a pump 91 for conveying the spraying agent in addition to driving the blower wheel 17. It may also be provided that the spraying agent is conveyed by gravity out of the spraying agent container 92. Adjacent to the outlet opening 35 a metering valve 93 is arranged on the blower tube 7 by means of which the spraying agent is supplied to the blower air stream.

The handle 10 is connected by means of joint 98 to the sleeve 14 that is secured on the blower tube 7. The joint 98 enables a rotary movement of the handle 10 to the right and to the left about a first axis of rotation 101 and a movement of the handle 10 in upward and downward direction about a second pivot axis 102.

Figure 22:
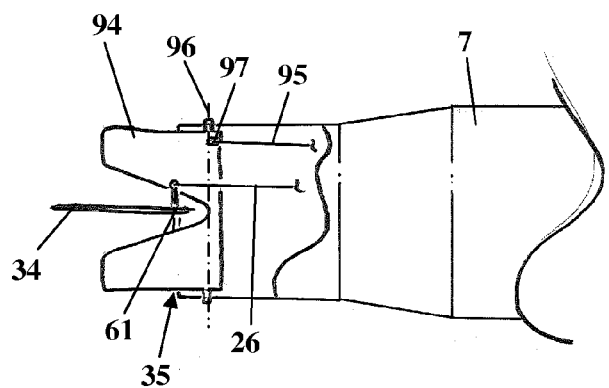
FIG. 22 is a schematic partially sectioned illustration of the blower tube of the spraying apparatus of FIG. 21.

As shown in FIG. 22, adjacent to the outlet opening 35 two flow guiding elements 34 and 94 are arranged. The flow guiding element 34 is pivotable about the pivot axis 61 that is approximately vertical in horizontal position of the blower tube 7. The second flow guiding element 94 is pivotable about the pivot axis 61 that is approximately horizontally positioned and extends perpendicular to the pivot axis 61. For actuating the flow guiding element 94, a Bowden cable 95 is provided that is connected to the handle 10 and engages the flow guiding element 94 by means of actuating lever 97. By means of the two flow guiding elements 34 and 94 that are positioned perpendicularly to each other, a pivot movement of the blower tube 7 in two directions that are perpendicular to each other can be realized. The deflection of the flow guiding element 94 can be realized mechanically or by means of an electrical actuator, as describe in connection with flow guiding element 34.

Figure 23:
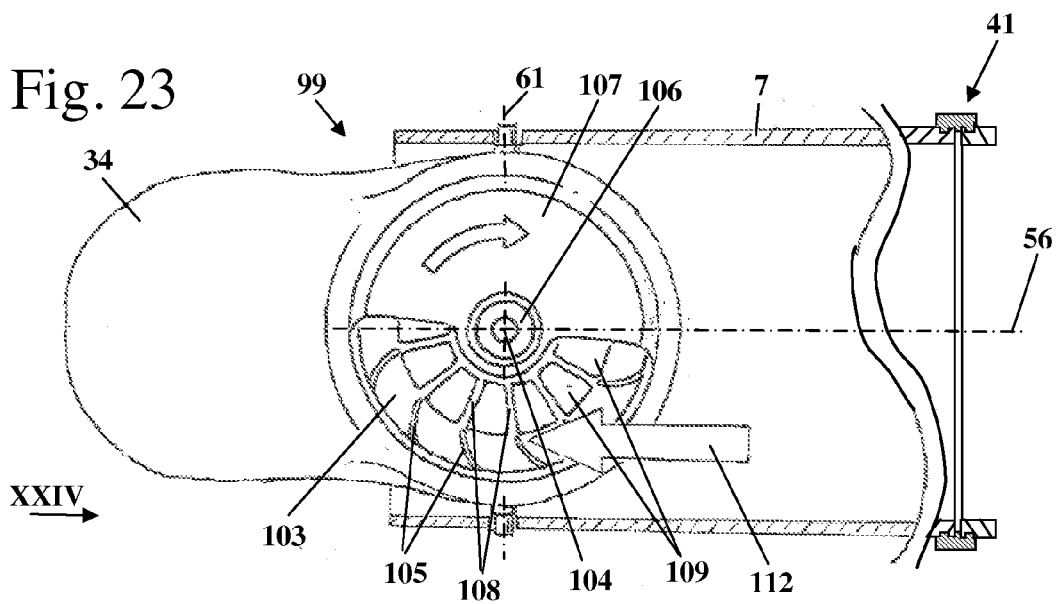
FIG. 23 is a schematic section illustration of an embodiment of a blower tube with pivoting device.

FIGS. 23 to 25 show a further embodiment of a pivoting device 99. The blower tube 7 is rotatably supported by means of a rotary joint 41 about longitudinal center axis 56 in accordance with the embodiment of FIG. 7. The handle 10 illustrated in FIGS. 24 and 25 is fixedly connected to the blower tube 7. In the blower tube 7, the flow guiding element 34 is supported pivotably about pivot axis 61. The flow guiding element 34 extends substantially in the area that is downstream of the pivot axis 61. The pivot axis 61 extends perpendicularly to the longitudinal center axis 56. On the flow guiding element 34 that is substantially embodied as a planar plate, a rotor 103 is rotatably supported by means of bearing 106 about axis of rotation 104. The axis of rotation 104 and the pivot axis 61 are arranged perpendicularly to each other and are positioned in the same plane. The rotor 103 is embodied as a fan wheel and supports a plurality of vanes 105. In the embodiment the rotor 103 is provided with vanes on both sides. The vanes 105 are exposed to the air stream only in the area of the rotor 103 where the vanes 105 are to be moved in the direction of the blower air stream in the blower tube 7 and where the blower air stream produces a force in the desired rotational direction. The blower air stream flows in the direction of arrow 112. In the area where the air guiding vanes 105 are moving opposite to the flow direction of the blower air stream in the blower tube 7, the air guiding vanes 105 are covered by cover 107.

The rotor 103 is advantageously of a lightweight construction. In the shown embodiment, the rotor 103 is provided with recesses 109 that are arranged in radial direction inwardly relative to the air guiding vanes 105 and serve for weight reduction; they are separated by ribs 108 from each other. In FIG. 24, the pivoting device 99 is shown in the rest position. The flow guiding element 34 is oriented parallel to the flow direction in the blower tube 7 so that no force about the pivot axis 61 is generated at the flow guiding element 34.

The axis of rotation 104 of the rotor 103 coincides with the horizontal 110 and the pivot axis 61 of the flow guiding element 34 coincides with the vertical 111.

For pivoting the blower tube 7, the operator tilts the handle 10 in the direction of arrow 113 and pivots in this way the blower tube 7 about the longitudinal center axis 56, for example, into the position illustrated in FIG. 25. In this position the axis of rotation 104 is positioned at a slant relative to the horizontal 110 at an angle γ. A corresponding angle γ results between the pivot axis 61 and the vertical 111. Pivoting or tilting of the axis of rotation 104 of the rotating rotor 103 generates gyroscopic forces that act about pivot axis 61 and cause pivoting of the flow guiding element 34 in the direction of arrow 114, i.e., onto the side that is opposite to the side toward which the handle has been tilted. In the view of FIGS. 24 and 25, the handle 10 has been tilted to the right and the flow guiding element 34 has been pivoted to the left with its downstream end. The blower air stream generated at the flow guiding element 34 generates a transverse force F acting on the flow guiding element 34 that is oriented transverse to the air stream direction and this force F moves the blower tube in the direction of arrow 115. The blower tube 7 pivots thus in the direction in which the handle 10 has been tilted.

Upon tilting of the handle 10 to the opposite side, the flow guiding element 34 is adjusted in the opposite direction, the transverse force acts in opposite direction, and the blower tube 7 is pivoted in the opposite direction to the arrow 115 in FIG. 25. The angle about which the handle 10 is tilted determines the magnitude of the gyroscopic forces acting on the flow guiding element 34 and thus the pivot angle of the flow guiding element 34, the magnitude of the counterforce F, and the force with which the blower tube 7 of pivoted. In the embodiment according to FIGS. 23 to 25 a simple configuration with few individual parts is realized. No additional energy source is required. Since the flow guiding element 34 is adjusted automatically into the central position as a result of the forces generated in operation by the air stream, a calibration of the system is not required.

The afore described embodiment variants for the actuating element, the transmission to the device for tilting the outflow direction, and the device for tilting the outflow direction can also be combined differently with each other. In the Figures, same reference numerals characterize elements that correspond functionally to each other.

In the illustrated embodiments, the flow guiding element 34 or the nozzle 54 is arranged in the rest position such that the outflow direction 100 is parallel to the longitudinal center axis 56 of the blower tube 7. However, it may also be advantageous that the flow guiding element 34 or the nozzle 54 in the rest position is inclined by a few degrees relative to the longitudinal center axis 56 so that also the outflow direction 100 is slanted or inclined relative to the longitudinal center axis 56 by a few degrees. This is schematically illustrated in FIG. 26 for the embodiment of FIGS. 13 to 15. Because of the inclined position, the rest position of the blower tube 7 can be adjusted. As shown in FIG. 26, the handle 67 in plan view onto the blower apparatus 65 is displaced laterally to the longitudinal center axis 56 of the blower tube 7. Because of this axis displacement, the outflow of the blower apparatus causes torque acting about the pivot axis 69 that in the plan view illustrated in FIG. 26 acts in counterclockwise direction. Because of the illustrated inclined position of the nozzle 54, the blower apparatus 65 in the rest position is substantially free of any forces acting on it and the operator in the rest position must not exert any force on the blower apparatus 65 in order to hold the blower tube 7 in the rest position. For this purpose, the longitudinal center axis 57 of the nozzle 54 is advantageously oriented such that the longitudinal center axis 57 intercepts approximately the pivot axis 69 of the blower apparatus 65. Accordingly, the air flow does not cause torque about the pivot axis 69. The longitudinal center axis 56 of the blower tube 7 is positioned relative to the longitudinal center axis 57 of the nozzle 54 at an angle δ that advantageously amounts to a few degrees.

The specification incorporates by reference the entire disclosure of German priority document 10 2011 014 344.0 having a filing date of Mar. 18, 2011.

While specific embodiments of the invention have been shown and described in detail to illustrate the inventive principles, it will be understood that the invention may be embodied otherwise without departing from such principles.

What is claimed is:

1. A blower apparatus comprising:
a drive motor;
a blower device operatively connected to said drive motor;
a blower tube connected with a first end to said blower device and having an outlet opening at a second end remote from said first end, wherein a blower air stream conveyed by said blower device passes through said blower tube in a direction of a longitudinal center axis of said blower tube and exits through said outlet opening in an outflow direction;
a pivoting device configured to pivot said blower tube wherein in a non-actuated state of said pivoting device said outflow direction is parallel to said longitudinal center axis of said blower tube;
wherein said pivoting device has a tilting device configured to tilt said outflow direction relative to said longitudinal center axis of said blower tube and utilizes a transverse force that is generated by said blower air stream at said outlet opening for pivoting said blower tube, wherein:
at least one adjustable flow guiding element is arranged in said blower tube in an area of said outlet opening, or
said blower tube comprises an adjustable nozzle and said outlet opening is provided at said adjustable nozzle.

2. The blower apparatus according to claim 1, wherein said pivoting device comprises an actuating element for adjusting said outflow direction, wherein said actuating element is actuated by an operator operating the blower apparatus.

3. The blower apparatus according to claim 2, wherein said outflow direction is adjusted in a direction opposite to a direction of actuation of said actuating element.

4. The blower apparatus according to claim 2, further comprising a handle that is rotatably supported and forms said actuating element.

5. The blower apparatus according to claim 2, further comprising a handle, wherein at least one section of said blower tube is supported to be rotatable about said longitudinal center axis of said blowertube, wherein said handle is secured on said at least one section, and said handle and said at least one section of said blower tube together form said actuating element.

6. The blower apparatus according to claim 2, wherein said actuating element is an operating lever.

7. The blower apparatus according to claim 2, wherein said actuating element comprises a sensor configured to detect a pivot movement initiated by the operator.

8. The blower apparatus according to claim 2, wherein a movement of said actuating element is transmitted mechanically onto said tilting device.

9. The blower apparatus according to claim 2, wherein a movement of said actuating element is transmitted electrically onto said tilting device.

10. The blower apparatus according to claim 9, wherein said actuating element effects a periodic adjustment of said outflow direction.

11. The blower apparatus according to claim 9, wherein said tilting device comprises an electrical actuator.

12. The blower apparatus according to claim 11, further comprising a battery as an energy supply of said electrical actuator.

13. The blower apparatus according to claim 11, further comprising a generator driven by the blower air stream and supplying said electrical actuator with energy.

14. The blower apparatus according to claim 11, further comprising an energy supply device connected to said drive motor to supply said drive motor with energy, wherein said energy supply device supplies said electrical actuator with energy.

15. The blower apparatus according to claim 2, wherein said tilting device comprises a rotor and wherein a position of said rotor is changed by said actuating element, wherein gyro forces acting on said rotor effect tilting of said outflow direction.

16. The blower apparatus according to claim 15, wherein said rotor is driven by the blower air stream.

17. The blower apparatus according to claim 15, wherein said tilting device comprises a flow guiding element, wherein said rotor is rotatably supported on said flow guiding element about an axis of rotation, wherein said rotor together with said flow guiding element is supported on said blower tube so as to be pivotable about a common pivot axis, wherein said axis of rotation and said common pivot axis extend transversely to each other.

18. The blower apparatus according to claim 2, wherein said pivoting device has elements for returning said outflow direction into a position parallel to said longitudinal center axis.

19. A handheld blower apparatus comprising:
a drive motor;
a blower device operatively connected to said drive motor;
a blower tube connected with a first end to said blower device and having an outlet opening at a second end remote from said first end, wherein a blower air stream conveyed by said blower device passes through said blower tube in a direction of a longitudinal center axis of said blower tube and exits through said outlet opening in an outflow direction;

a pivoting device configured to pivot said blower tube wherein in a non-actuated state of said pivoting device said outflow direction is parallel to said longitudinal center axis of said blower tube;

wherein said pivoting device has a tilting device configured to tilt said outflow direction relative to said longitudinal center axis of said blower tube and utilizes a transverse force that is generated by said blower air stream at said outlet opening for pivoting said blower tube;

a housing on which said blower tube and a handle are secured.

20. A backpack blower apparatus comprising:

a drive motor;

a blower device operatively connected to said drive motor;

a blower tube connected with a first end to said blower device and having an outlet opening at a second end remote from said first end, wherein a blower air stream conveyed by said blower device passes through said blower tube in a direction of a longitudinal center axis of said blower tube and exits through said outlet opening in an outflow direction;

a pivoting device configured to pivot said blower tube wherein in a non-actuated state of said pivoting device said outflow direction is parallel to said longitudinal center axis of said blower tube;

wherein said pivoting device has a tilting device configured to tilt said outflow direction relative to said longitudinal center axis of said blower tube and utilizes a transverse force that is generated by said blower air stream at said outlet opening for pivoting said blower tube;

a carrying frame to be carried on the back of an operator, wherein said blower tube is movably arranged relative to said carrying frame and wherein a handle is arranged on said blower tube.

* * * * *